United States Patent
Lo

(10) Patent No.: US 9,977,619 B2
(45) Date of Patent: May 22, 2018

(54) TRANSFER DESCRIPTOR FOR MEMORY ACCESS COMMANDS

(71) Applicant: Vivante Corporation, Santa Clara, CA (US)

(72) Inventor: Mankit Lo, Fremont, CA (US)

(73) Assignee: Vivante Corporation, San Jose, CA (US)

( * ) Notice: Subject to any disclaimer, the term of this patent is extended or adjusted under 35 U.S.C. 154(b) by 377 days.

(21) Appl. No.: 14/934,707

(22) Filed: Nov. 6, 2015

(65) Prior Publication Data

US 2017/0131939 A1     May 11, 2017

(51) Int. Cl.
     *G06F 3/06* (2006.01)
(52) U.S. Cl.
     CPC ............ *G06F 3/0647* (2013.01); *G06F 3/061* (2013.01); *G06F 3/0604* (2013.01); *G06F 3/0673* (2013.01)
(58) Field of Classification Search
     None
     See application file for complete search history.

(56) References Cited

U.S. PATENT DOCUMENTS

| | | |
|---|---|---|
| 3,739,352 A | 6/1973 | Packard |
| 5,761,740 A | 6/1998 | Johnson |
| 5,941,959 A | 8/1999 | Fishler |
| 5,961,639 A | 10/1999 | Mallick |
| 6,115,761 A | 9/2000 | Daniel |
| 6,145,016 A | 11/2000 | Lai |
| 6,754,732 B1 * | 6/2004 | Dixon ..................... G06F 13/28 710/22 |
| 7,051,123 B1 | 5/2006 | Baker |
| 7,293,121 B2 | 11/2007 | Hayden |
| 7,363,467 B2 | 4/2008 | Vajapeyam |
| 7,548,996 B2 | 6/2009 | Baker |
| 7,680,963 B2 | 3/2010 | Go |
| 7,747,808 B2 | 6/2010 | Ng |
| 2005/0097244 A1 * | 5/2005 | Hayasaka ............... G06F 13/28 710/52 |
| 2010/0198998 A1 | 8/2010 | Hiramoto et al. |
| 2012/0131309 A1 | 5/2012 | Johnson et al. |

* cited by examiner

*Primary Examiner* — Corey S Faherty

(74) *Attorney, Agent, or Firm* — Stevens Law Group; David R. Stevens

(57) ABSTRACT

A computer system processes instructions including an instruction code, source type, source address, destination type, and destination address. The source and destination type may indicate a memory device in which case data is read from the memory device at the source address and written to the destination address. One or both of the source type and destination type may include a transfer descriptor flag, in which case a transfer descriptor identified by the source or destination address is executed. A transfer descriptor referenced by a source address may be executed to obtain an intermediate result that is used for performing the operation indicated by the instruction code. The transfer descriptor referenced by a destination address may be executed to determine a location at which the result of the operation will be stored.

20 Claims, 5 Drawing Sheets

| Instruction Code 300 | Source Type 302 | Source Address 304 | Dest. Type 306 | Destination Address 308 |
|---|---|---|---|---|

Fig. 3

TRANSFER DESCRIPTOR FOR MEMORY ACCESS COMMANDS

FIELD OF THE INVENTION

This invention relates to systems and methods for implementing memory access commands.

BACKGROUND OF THE INVENTION

In conventional computer systems, a memory access command includes an instruction (read, write, erase, etc.), a source type (e.g. designation of a memory device), a source address, a destination type, and a destination address. More complex instructions may be implemented by using a "very long instruction word" (VLIW) that can specify multiple actions to be taken and provide for very specific control of processing functions. However, a VLIW system requires a large amount of memory for instruction storage and requires a large area to for the corresponding circuits.

The systems and methods disclosed herein provide an improved approach for implementing complex commands, particularly memory access commands.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3 is a diagram of the fields of an instruction word in accordance with the prior art.

DETAILED DESCRIPTION

Figure 1:
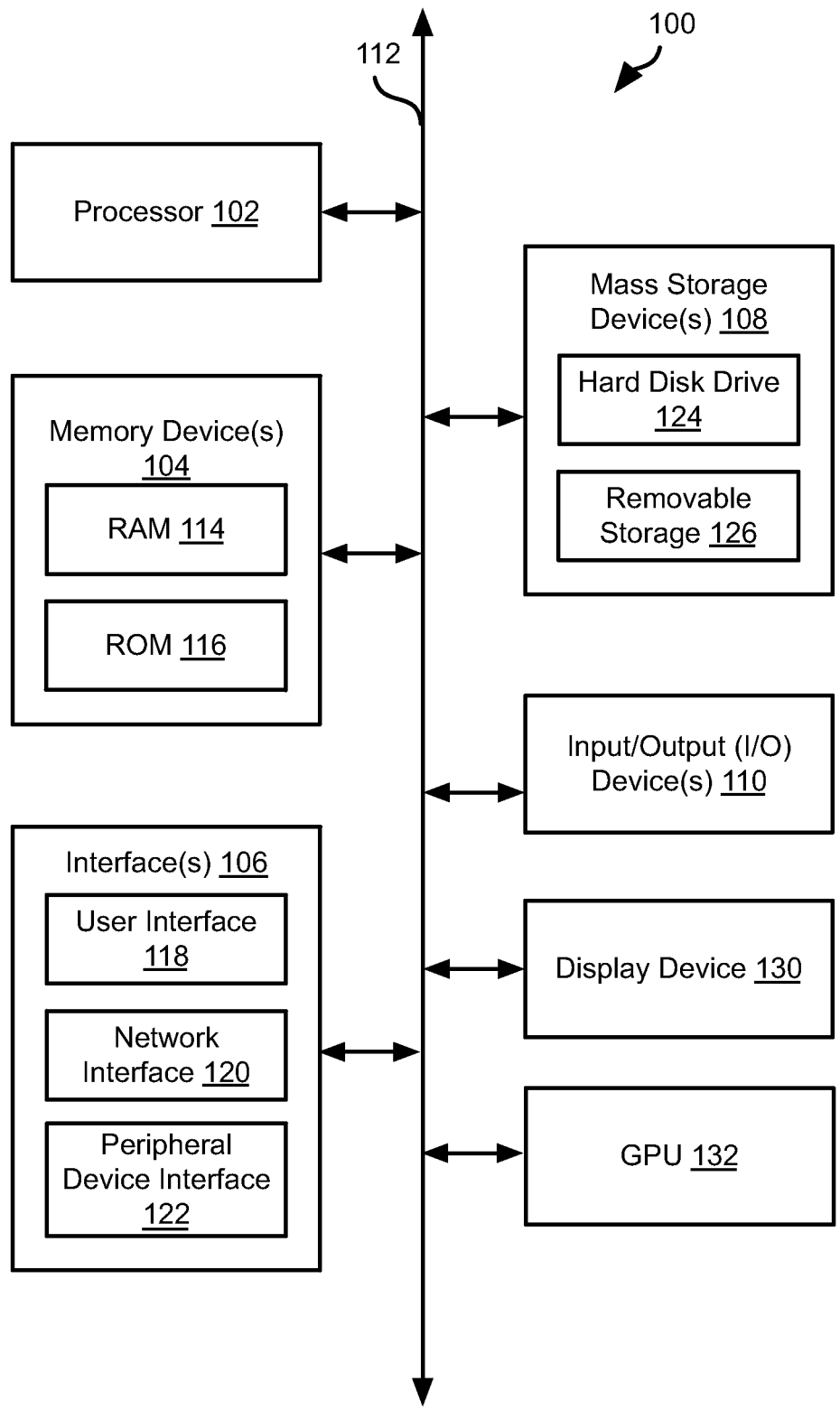
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Referring to FIGS. 2A-2D, as described in greater detail below, memory access commands may reference a transfer descriptor rather than a source address and/or destination address. Transfer descriptors are executable code that, when executed, generate a value that is then used as the address (source or destination) for a memory access commands. The location where the transfer descriptors are stored and the device that executes the transfer descriptors may vary.

Figure 2C:
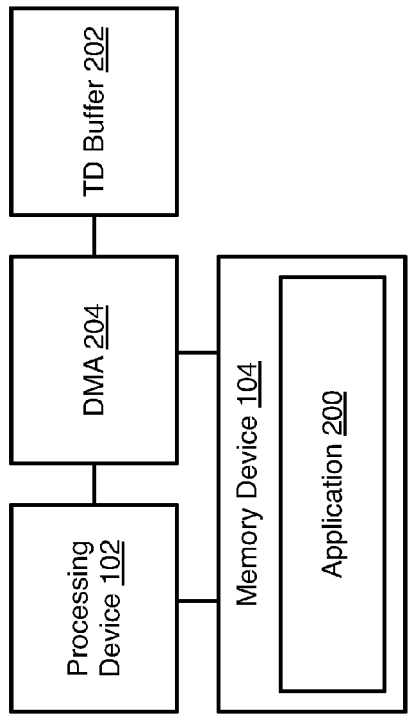
FIGS. 2A to 2D are schematic block diagrams of components for using transfer descriptors in accordance with an embodiment of the present invention.
Figure 2D:
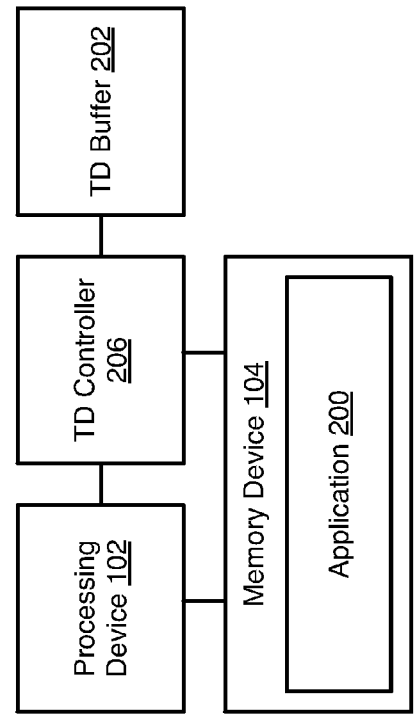
Figure 2A:
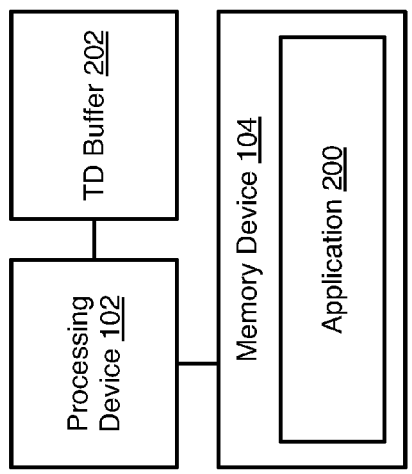

For example, referring specifically to FIG. 2A, the processing device 102 may execute an application 200 stored in a memory device 104. The instructions of the application 200 may be retrieved by the processing device 102 and executed. Where the instruction references a transfer descriptor, the processing device 102 may retrieve the transfer descriptor from a transfer descriptor buffer 202 embodied as a separate memory device 104, e.g. a cache memory or other memory device coupled to the processor.

Figure 2B:
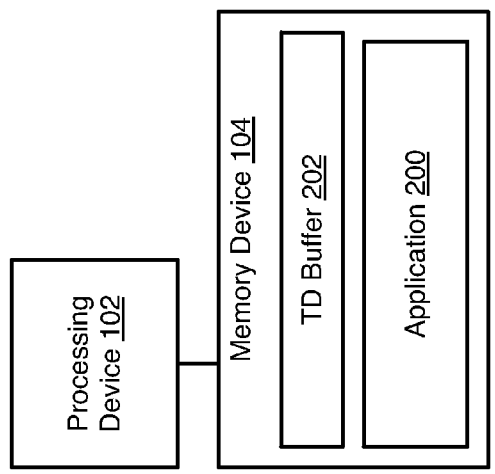

Referring to FIG. 2B, in other embodiments, the transfer descriptor buffer 202 is an area of storage within the same memory device 104 as the application 200.

Referring to FIG. 2C, in other embodiments, a direct memory access (DMA) controller is coupled to the processing device 102 and the memory device 104 as well as to the transfer descriptor buffer 202. The transfer descriptor of a memory access command may then be executed by the DMA controller 204, which may then retrieve a data value based on a result of the transfer descriptor from the memory device 104 and return it to the processing device 102 or other component.

Referring to FIG. 2D, in yet another implementation a separate component, referred to herein as the transfer descriptor controller 206, may process transfer descriptors from the transfer descriptor buffer 202, retrieve data values according to the result of processing of the transfer descriptors and return the data values to the processing device 102.

Referring to FIG. 3, an instruction word executed by the processing device 102 may include some or all of the illustrated fields, including an instruction code 300, source type 302, source address 304, destination type 306, and destination address 308. The illustrated format for an instruction word is conventional and may be executed by many processors or memory controllers known in the art. The fields of the conventional instruction word are repurposed and used to implement novel transfer descriptors as described in greater detail below.

An instruction code 300 defines an operation to be performed with respect to data retrieved from the source address 304 with the result of the operation being written to the destination address 308. The source type 302 is conventionally used to specify the memory device from which the source data is to be read from the source address 304. Likewise, the destination type 306 is conventionally used to specify the memory device from which the result of the operation is to be written at the destination address 308. In accordance with the methods described herein, the source type 302 may refer to either a memory device or a transfer descriptor. Where the source type 302 refers to a transfer descriptor, the source address 304 is decoded to identify the transfer descriptor to execute. Likewise, where the destination type 306 refers to a transfer descriptor, the destination address 308 is decoded to determine the transfer descriptor to execute. The source type 302 and destination type 306 preferably have no impact on the operation performed as specified by the instruction code 300. Stated differently, the source type 302 and destination type 306 are used exclusively to determine the data to be processed according to the operation specified by the instruction code 300 but the operation performed on the data is identical regardless of whether the data was retrieved directly from the source address 304 and destination address 308 or as the result of execution of a transfer descriptor.

Figure 4A:
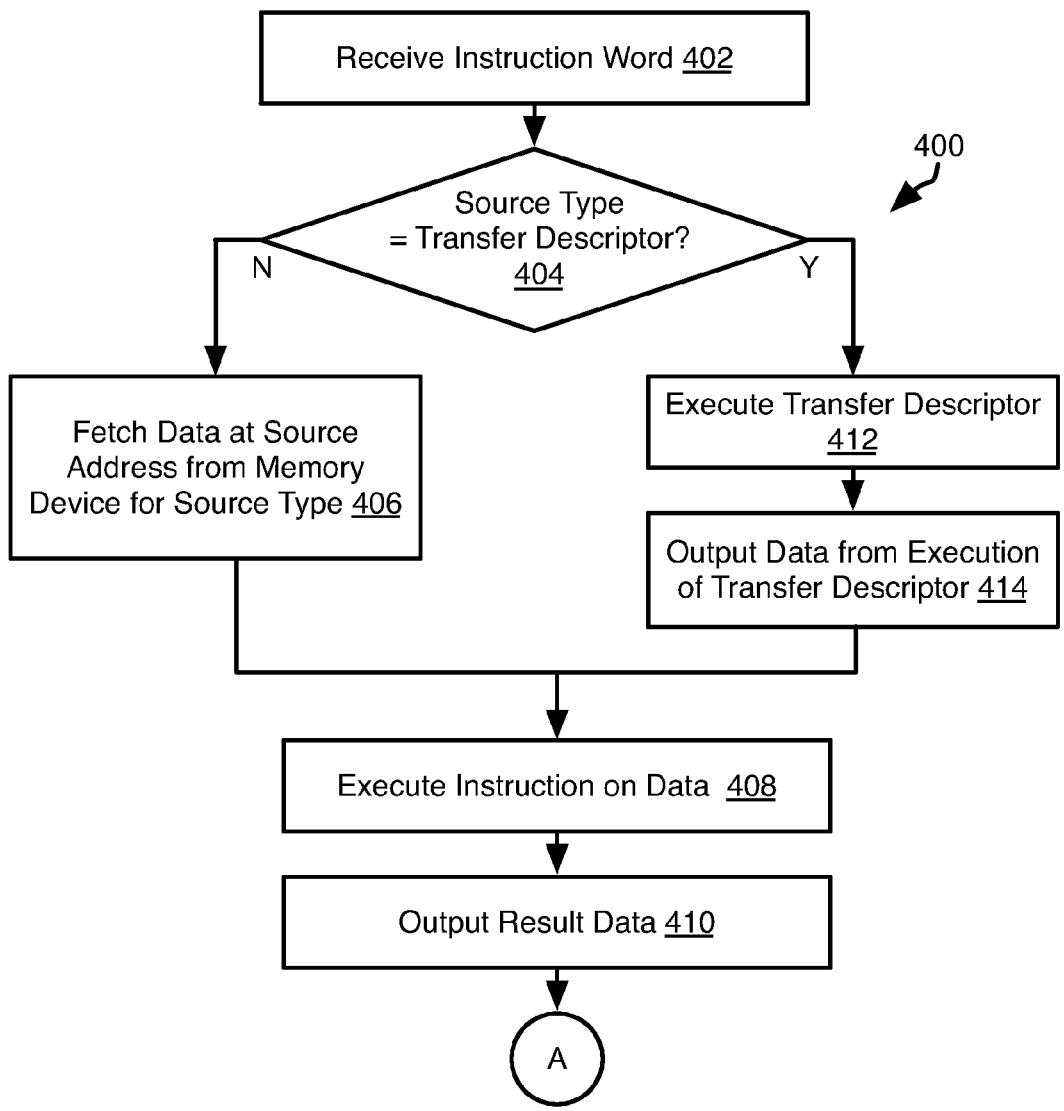
FIGS. 4A and 4B illustrate a process flow diagram of a method for processing transfer descriptors in memory access commands in accordance with an embodiment of the present invention.
Figure 4B:
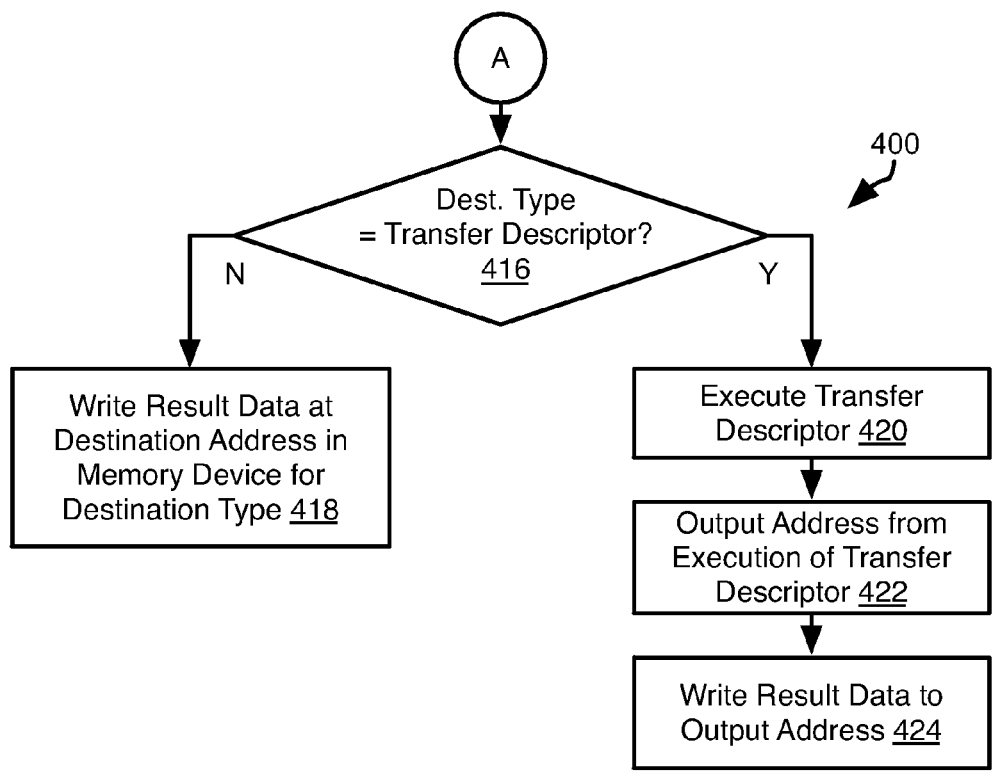

Referring to FIGS. 4A and 4B, the illustrated method 400 may be executed when processing an instruction, such as an instruction having the fields of the instruction of FIG. 3. As noted above, the steps of the method 400 may be executed by the processing device 102, DMA controller 204, dedicated transfer controller 206, or other component or a combination of two or more of these devices. For example, in some embodiments, the method 400 may be transparent to the processing device 102, i.e. memory access instructions may be submitted to a memory control system and responses received without any processing of transfer descriptors being performed by the processing device 102.

The method 400 includes receiving 402 and instruction word (e.g. an instruction word 300) and evaluating 404 the source type of the instruction word. If the source type is not a transfer descriptor flag, then the data located at the source address of the instruction word is fetched 406 from the memory device 104 referenced by the source type. The operation indicated by the instruction code of the instruction word is then executed 408 and a result of the operation ("result data") is output 410.

If the source type is found 404 to include the transfer descriptor flag, then a transfer descriptor is executed 412. In particular, a transfer descriptor corresponding to the source address of the instruction word is executed 412. For example, where transfer descriptors are stored in a buffer, the transfer descriptor having a start address at the source address in the buffer may be executed 412. Alternatively, each transfer descriptor may have an identifier and the transfer descriptor having an identifier equal to the source address of the instruction word may be executed 412. The result of execution 412 of the transfer descriptor is output data that is output 414 by the transfer descriptor (hereinafter a "first intermediate value").

In some embodiments, the operation indicated by the instruction code of the instruction word is executed 408 and the result of this operation is output 410. In other embodiments, the intermediate result is an address. Accordingly, the value stored at the intermediate value in the memory device 104 is retrieved and the operation indicated by the instruction code is then executed 408 with respect to the retrieved value.

Referring to FIG. 4B, processing of the instruction word received at step 402 may further include evaluating 416 the destination type of the instruction word. If the destination type is not a transfer descriptor flag, then the result data is written 418 to the memory device 104 indicated by the destination type of the instruction word at the destination address of the instruction word.

If the destination type is found 418 to include a transfer descriptor flag, then the transfer descriptor identified by the destination address of the instruction word is executed 420. The transfer descriptor may be identified based on the destination address in the same manner that the transfer descriptor is described above as being identified for a source address.

Execution 420 of the transfer descriptor may include an output value ("a second intermediate result"). The second intermediate result may be an address. The result data of step 410 is then written 424 to the memory device 104 at the address corresponding to the second intermediate result.

In some embodiments, an operation only includes one operated (source or destination) accordingly, in some embodiments only the source type potentially results in execution of a transfer descriptor as described for FIG. 4A or only the destination type potentially corresponds to a transfer descriptor as described for FIG. 4B. In other instances, two transfer descriptors are executed for each instruction word as indicated by both of the source and destination types.

As is apparent from the foregoing description, the transfer descriptors provide for the customization and expansion of functions performed during a memory access function. Below are examples of functionality that may be implemented using a transfer descriptor.

A first-in-first-out (FIFO) buffer may be implemented using transfer descriptors thereby eliminating the need for sharing of objects among multiple threads of execution accessing the FIFO buffer. A first transfer descriptor may maintain a write pointer indicating the current location at which new entries are to be written to the FIFO buffer. A second transfer descriptor may maintain a read pointer indicating the current location at which new entries are to be read from the FIFO buffer. The first transfer descriptor may define a function for updating the write pointer in response to write requests and for returning the current value of the pointer in response to write requests. For example, the first transfer descriptor may contain the size of the buffer (e.g. number of entries) and the start address of the buffer.

For the first transfer descriptor, receiving a write request, the pointer is incremented. If the incremented value exceeds the size of the buffer or is outside the end address of the buffer, then the pointer may be updated to point to the start address of the buffer. For the second transfer descriptor, upon receiving a read request, the pointer is updated and, if it exceeds the size of the buffer or points to an address outside the end address of the buffer, it is set to the start address of the buffer.

Accordingly, an instruction may be generated by an application with an instruction code indicating a MOVE instruction, a source type set to the transfer descriptor flag, and a source address pointing to the first transfer descriptor. Upon receiving this instruction, the first transfer descriptor is executed, resulting in output of the current value of the write pointer and updating of the write pointer. The value stored at the current value of the write pointer in the memory device 104 is then read and returned as the result of the instruction.

In another example, an instruction maybe generated by an application with an instruction code indicating a MOVE instruction, and a destination type set to the transfer descriptor flag and a destination address pointing to the second transfer descriptor. Upon receiving this instruction, the second transfer descriptor is executed, resulting in output of the current value of the read pointer and updating of the read pointer. A data value may then be written to the current value of the read pointer in the memory device 104.

As is apparent from the above example, the transfer descriptors may include state variables that are persistent from one instruction to the next and that are updated when the transfer descriptor is called. In some embodiment, an application or other software or hardware component may monitor the state variables of one or more transfer descriptors and generate events. For example, if the state variables of a transfer descriptor indicate that a threshold condition is met, then one or more threads may be blocked, branch to a different thread of execution, be started or instantiate, or be subject to other thread management functions.

For example, the read pointer and write pointer of transfer descriptors defining a FIFO buffer as described above may be compared, if the read pointer is less than a threshold value offset from than the write pointer, then the buffer may be deemed to be almost empty and threads attempting to make requests to the FIFO buffer may be blocked until the threshold is found to be exceeded. Likewise, where the read pointer is above a second threshold amount offset from the write pointer, the FIFO buffer may be deemed to be almost full and threads attempting to write to the FIFO buffer may be blocked until the second threshold is no longer exceeded.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:

1. A method comprising:
providing a memory device storing a plurality of instructions, each instruction of the plurality of instructions including (a) an instruction code, (b) a source type, and (c) a source address;
providing a processing device operably coupled to the memory device;
retrieving, by the processing device, a first instruction of the plurality of instructions from the memory device;
processing, by at least one of the processing device and a memory control system, the first instruction by—
determining that the source type of the first instruction is a transfer descriptor flag;
in response to determining that the source type of the first instruction is the transfer descriptor flag, executing a first transfer descriptor stored at the source address of the first instruction in a transfer buffer to obtain a first intermediate result;
executing the instruction code of the first instruction on the first intermediate result.

2. The method of claim 1, further comprising:
retrieving, by the processing device, a second instruction of the plurality of instructions from the memory device;
processing, by one of the processing device and a memory control system, the second instruction by—
determining that the source type of the second instruction is not a transfer descriptor flag;
in response to determining that the source type of the second instruction is not a transfer descriptor flag, requesting a data value stored at the source address of the second instruction; and
executing the instruction code of the second instruction on the data value.

3. The method of claim 2, wherein the instruction code of the second instruction is identical to the instruction code of the first instruction such that executing the instruction code of the second instruction includes performing an identical operation as executing the instruction code of the first instruction.

4. The method of claim 3, wherein executing the instruction code of the first instruction on the first intermediate result results in a first result value, the method further comprising:
determining that the destination type of the first instruction is the transfer descriptor flag; in response to determining that the destination type of the first instruction is the transfer descriptor flag, executing a second transfer descriptor stored at the destination address of the first instruction in the transfer buffer to obtain a second intermediate result; and
storing the first result value stored at an address corresponding to the second intermediate result in the memory device.

5. The method of claim 4, wherein executing the instruction code of the second instruction on the data value results in a second results value, the method further comprising:
determining that the destination type of the second instruction is not the transfer descriptor flag;
in response to determining that the destination type of the second instruction is not the transfer descriptor flag, storing the second result value in the memory device at the destination address of the second instruction.

6. The method of claim 5, wherein executing the first transfer descriptor comprises updating a state of the first transfer descriptor; and
wherein executing the second transfer descriptor comprises updating a state of the second transfer descriptor.

7. The method of claim 6, wherein executing the first transfer descriptor further comprises:
identifying at least one read address according to the state of the first transfer descriptor; and
retrieving at least one retrieved data value from the at least one read address in the memory device; and
wherein the first intermediate result is at least one of the retrieved data and a value derived from the at least one retrieved data value.

8. The method of claim 5, wherein processing the first instruction is performed by the processor while executing a first thread of execution instantiated by the application, the method further comprising:
evaluating, by the processor, the state of at least one of the first transfer descriptor and the second transfer descriptor;
determining that at least one of the state of first transfer descriptor and the state of the second transfer descriptor meets a threshold condition; and
in response to determining that the at least one of the state of first transfer descriptor and the state of the second transfer descriptor meets the threshold condition, blocking execution of at least one of the at least one of the first thread of execution and a different thread of execution instantiated by the application.

9. The method of claim 1, wherein the transfer buffer is a separate device from the memory device.

10. The method of claim 9, wherein both of
determining that the source type of the first instruction is the transfer descriptor flag; and
in response to determining that the source type of the first instruction is the transfer descriptor flag, executing the first transfer descriptor stored at the source address of the first instruction in the transfer buffer to obtain the first intermediate result
are performed by a separate device from the processing device interposed between the processing device and the memory device.

11. A system comprising:
a memory device;
a processing device operably coupled to the memory device, the processing device programmed to process instructions including (a) an instruction code, (b) a source type, and (c) a source address, the processing device further programmed to:
retrieve an instruction from the memory device;
at least one of process the instruction by the processing device and process the instruction in a memory control system interposed between the memory device and the processing device effective to—
evaluate the source type of the instruction;
if the source type of the instruction is a transfer descriptor flag, (i) retrieve a corresponding transfer descriptor at an address corresponding to the source address in a transfer buffer, (ii) execute the corresponding transfer descriptor to obtain a first intermediate result and (iii) execute the instruction code of the instruction on the first intermediate result to obtain a result value.

12. The system of claim 11, wherein the processing device is further programmed to at least one of process the instruction by the processing device and invoke processing of the instruction in the memory control system interposed between the memory device and the processing device effective to—
if the source type of the instruction is not the transfer descriptor flag, (iv) retrieve a data value stored in the memory device at the source address of the instruction, and (v) execute the instruction code of the instruction on the data value stored in the memory device at the source address.

13. The system of claim 12, wherein at least one of (a) the processing device is programmed to execute the instruction code such that an operation performed in response to the instruction code is identical regardless of the source type and (b) the processing device is programmed to process the instruction in the memory control system and the memory control system is programmed such that the operation performed in response to the instruction code is identical regardless of the source type.

14. The system of claim 13, wherein the processing device is further programmed to at least one of process the instruction by the processing device and invoke processing of the instruction in the memory control system interposed between the memory device and the processing device effective to—
evaluate the destination type of the instruction;
if the destination type of the instruction is the transfer descriptor flag, (vi) executing a second transfer descriptor stored in the transfer buffer at an address corresponding to the destination address of the instruction to obtain a second intermediate result, and (vii) store the result value at an address corresponding to the second intermediate result in the memory device.

15. The method of claim 14, wherein the processing device is further programmed to at least one of process the instruction by the processing device and invoke processing of the instruction in the memory control system interposed between the memory device and the processing device effective to—
if the destination type of the instruction is not the transfer descriptor flag, store the result value in the memory device at the destination address of the instruction.

16. The system of claim 15, wherein the first transfer descriptor includes executable code effective to update a state of the first transfer descriptor; and
wherein the second transfer descriptor includes executable code effective to update a state of the second transfer descriptor.

17. The system of claim 16, wherein the first transfer descriptor includes executable code effective to:
identify at least one read address according to the state of the first transfer descriptor; and
retrieve at least one retrieved data value from the at least one read address in the memory device; and
calculate the first intermediate result as at least one of the retrieved data and by evaluating a function of with respect to the at least one retrieved data value.

18. The method of claim 16, wherein the processing device is further programmed to:
evaluate the state of at least one of the first transfer descriptor and the second transfer descriptor;
if the state of the at least one of the first transfer descriptor and the second transfer descriptor meets a threshold condition, block execution of at least one thread of execution executed by the processing device.

19. The method of claim 11, wherein the transfer buffer is a separate device from the memory device.

20. A system comprising:
a memory device storing an application including a plurality of instructions, at least a portion of the instructions including a plurality of memory access commands, each memory access command of the plurality of memory access commands including instruction word including (a) an instruction code, (b) a source type, (c) a source address, (d), a destination type, and (e) a destination address;
a processing device coupled to the memory device and programmed to execute the instructions, the processing device further programmed to execute the plurality of memory access commands by, for each memory access command:
(i) evaluating the source type of the each memory access command;
(ii) if the source type corresponds to the memory device, requesting data stored at the source address of the each memory access command in the memory device, executing an operation corresponding to the instruction code on the data stored at the source address of the each memory access command to obtain a final result;
(iii) if the destination type corresponds to the memory device, requesting writing of the final result to the destination address of the each memory access command in the memory;
(iv) if the source type is a transfer descriptor flag—
executing a first transfer descriptor stored at an address corresponding to the source address of the each memory access command in a transfer buffer including one of the memory device and a separate buffer device, the first transfer descriptor programmed to output a first intermediate result;

executing the operation corresponding to the instruction code on the first intermediate result to obtain the final result;

(v) if the destination type is the transfer descriptor flag— executing a second transfer descriptor stored at an address corresponding to the destination address of the each memory access command in the transfer buffer, the second transfer descriptor programmed to output a second intermediate result;

request writing of the final result at a location corresponding to the second intermediate result in the memory device.

\* \* \* \* \*